D. WOLF,
Assignor, by mesne assignments, to W. H. BEEBE.
Mowing-Machines.
No. 9,216. Reissued May 25, 1880.
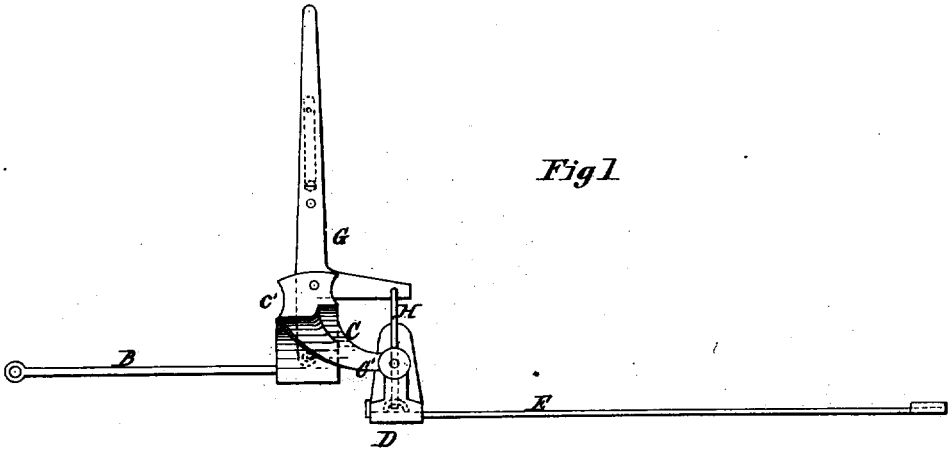
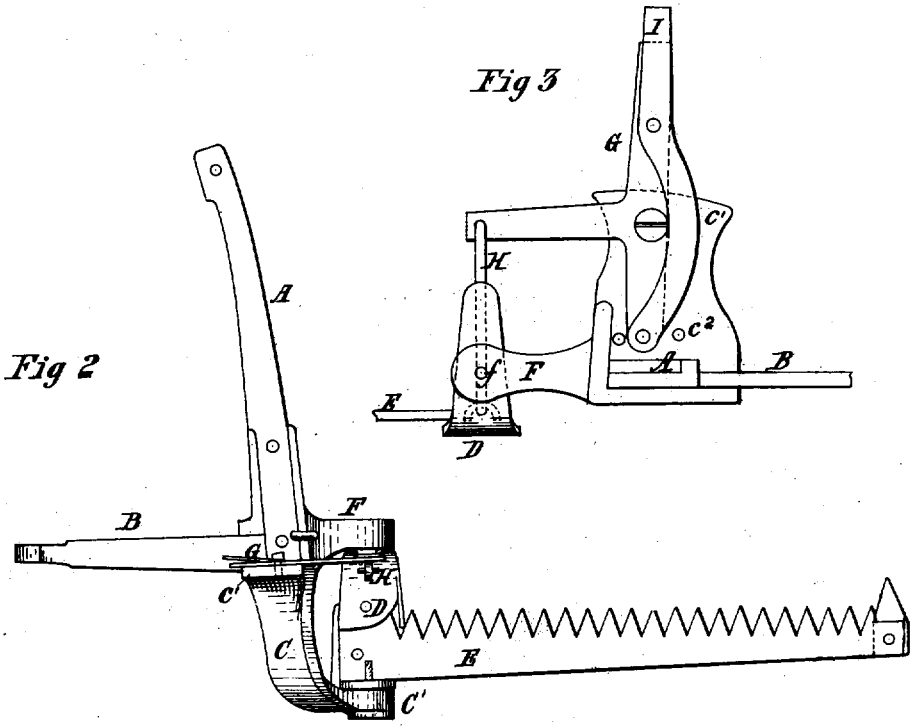
Witnesses
H. C. Collier
Thomas H. Pease
Inventor
David Wolf
By Coburn & Shaw
Attorneys
N. PETERS, PHOTO-LITHOGRAPHER, WASHINGTON, D. C.

UNITED STATES PATENT OFFICE.

DAVID WOLF, OF AVON, PENNSYLVANIA, ASSIGNOR, BY MESNE ASSIGNMENTS, TO WILLIAM H. BEEBE, OF CHICAGO, ILLINOIS.

MOWING-MACHINE.

SPECIFICATION forming part of Reissued Letters Patent No. 9,216, dated May 25, 1880.

Original No. 168,700, dated October 11, 1875. Application for reissue filed April 27, 1880.

*To all whom it may concern:*

Be it known that I, DAVID WOLF, of Avon, in the county of Lebanon and State of Pennsylvania, have invented certain new and useful Improvements in Mowing-Machines, which are fully described in the following specification, reference being had to the accompanying drawings, in which—

Figure 1 is a rear elevation of a cutter-bar and its attachments to which my improvement has been applied. Fig. 2 is a plan view of the same, and Fig. 3 is a front view of the same.

My invention relates to that class of harvesting-machines in which the shoe which carries the finger-beam is hinged to that part of the machine by means of which it is carried forward over the ground, so that it may be rocked or tilted to vary the inclination of the fingers.

The object of this invention is to provide for conveniently rocking or tilting the finger-bar of mowing and reaping machines and locking the same in different positions to adapt the cutting apparatus for work upon smooth ground, upon rough or stony ground, or in lodged grass or grain.

The improvement is limited to a peculiar kind of coupling, by means of which the finger-beam is connected to the main or draft frame. This coupling, when completed, is substantially of X form, though somewhat distorted. Two of the diverging arms are hinged, respectively, to the front and rear portions of the machine, while the other two, which are shorter than the former, are bent downward and constitute a short fork, which embraces the shoe and to the arms of which said shoe is attached, thereby making a short coupling device, as distinguished from the well-known drag-bar.

The invention consists in the combination of this peculiar coupling device with a shoe carrying the finger-beam, arranged within the forked end of the coupling, to the rear arm of which it is hinged, and a lever mounted on the coupling and connected to the shoe, whereby the latter may be rocked or tilted at will.

It also consists in the combination of the above-named elements with a locking device, whereby the lever may be locked in any position to hold the shoe in any adjustment.

It also consists in combinations of special devices organized for the purpose of carrying out my invention in a practical manner.

The construction and organization of the mechanism and devices by means of which I effect an embodiment of my invention in one way will be hereinafter fully described, and the special improvements which it is desired to secure by Letters Patent pointed out definitely in the claims.

The inner portion of the coupling-frame consists of two short bars, A and B, the former of which is extended forward between the wheels and hinged to the tongue, while the latter is extended inward and hinged to the rear part of the machine. The other ends of these bars are brought together at the grain side of the machine and secured to a kind of bracket, C, which is forked, and constitutes the outer portion of the coupling. The fork-arms C′ and F of the bracket are shorter than the bars A and B, and are bent downward and outward for the purpose of bringing their lower extremities into proper position for the attachment of the shoe thereto. The distance between these two fork-arms at their lower ends is just sufficient to permit the shoe D to be placed within them and be embraced thereby, one arm at the rear and one at the front of the shoe.

The rear end of the shoe D is hinged or pivated to the forward side of the lower or outer end of the rear arm, C′, of the fork, the joint being of such construction that the shoe may be turned in both directions to raise and lower the outer end of the finger-bar E, attached thereto, and to raise and depress the fingers by rocking the shoe.

The upwardly-projecting forward end of the shoe D has a slot or groove formed in it to receive a pivot-pin, *f*, attached to the front arm, F, of the fork, thereby forming a connection between the forward end of the shoe and the front arm of the fork of the coupling, and also providing a guide for this end of the shoe as it is raised and lowered.

Upon the rear fork-arm, C′, is formed an upwardly-projecting flange, $c'$, in the upper part of which is a hole to receive the pivot of the lifting or regulating lever G, which is made of three arms, and is pivoted at the point of meeting of said three arms to the upper part of the extension or flange $c'$ of the arm C'.

To the end of the side arm of the lever G is pivoted the upper end of the connecting-rod H, the lower end of which is pivoted to the shoe D. The upper arm of the lever G projects into such a position that it may be conveniently reached and operated by the driver. To the side of the lever G is pivoted the lever-catch I, the catch-pin attached to the lower end of which passes through a hole in the lower end of the lower arm of the lever G and enters one or the other of the three or more holes $c^2$, formed in the lower part of the extension or flange $c'$, so as to hold the cutter-bar E securely when adjusted.

By this construction the shoe may be rocked or tilted in a direction transverse to the finger-beam to raise and lower the fingers and cutters with reference to the ground over which the finger-beam is moving without backward or forward thrust thereof, which produces clogging, and may be locked in its adjusted position; also, when the finger-bar has been turned into an upright position, if the lever G is adjusted to bring the pin of the catch-lever I into the third hole, the finger-bar will be locked in this position.

It will be seen that the lifting or tilting lever is mounted directly on the forked coupling-frame, by which arrangement the relation between the lever and shoe is not changed by inequalities of the ground over which the machine is drawn, as would be the case if the lever was mounted on the main frame. The coupling-frame, being hinged, rises and falls, and the shoe with it, as they pass over uneven ground, and hence their relation to each other is not changed. This prevents sudden jerking of the cutting apparatus and strain on the lever-connection.

The slot or recess and pin making the connection between the forward end of the shoe and the forward arm of the fork guide the shoe and hold it from lateral strain as it is tilted up and down, while at the same time it permits a free vertical movement.

The forked coupling, combined with the hinged vibrating shoe and lever, as described above, forms a very convenient and compact mechanism for the purpose described, and at the same time is very simple and efficient. It is also evident that in tilting the shoe it may fall below as well as rise above the plane of its hinge.

Having thus described my invention, what I claim as new, and desire to secure by Letters Patent, is—

1. The combination, in a mowing-machine, of the following elements: a hinged forked coupling device the outer short arms of which are bent downward and constitute a fork, within which the shoe is received, a shoe arranged to run upon the ground over which it is drawn, and connected at its rear end to the rear arm of the coupling-fork by a hinge, which permits it to be vibrated or tilted in the direction of its length, a finger-beam attached to the shoe, and a tilting-lever mounted on the hinged coupling and connected to the forward end of the shoe, whereby the latter may be raised at will by the attendant on the machine.

2. The combination, in a mowing-machine, of the following elements: a hinged forked coupling device the outer short arms of which are bent downward and constitute a fork embracing the shoe, a shoe arranged to run upon the ground over which it is drawn, and connected at its rear end to the rear arm of the coupling-fork by a hinge, which permits it to be vibrated or tilted in the direction of its length, and at its front end to the forward arm of the coupling-fork by a slot-and-pin connection, and a tilting-lever mounted on the hinged coupling and connected to the front end of the shoe.

3. The combination, in a mowing-machine, of the following elements: a shoe arranged to run upon the ground, a finger-beam attached at its inner end to the shoe, a forked coupling, the rear arm of the fork being connected to the rear end of the shoe by a hinge, which permits the shoe to be tilted, and the forward arm of the fork to the front end of the shoe by a slot-and-pin device, which guides and holds the front end of the shoe as it moves up and down, a tilting-lever mounted on the hinged coupling, and a locking device for holding the shoe at any desired height.

4. The forked coupling, in combination with a tilting-shoe carrying the finger-beam, hinged at its rear end to the rear arm of the coupling-fork, and connected at its front end to the forward arm of the fork by a loose slot-and-pin connection, a tilting-lever mounted on the hinged coupling, the short horizontal arm of which is connected to the front end of the shoe, substantially as described.

5. The forked coupling, in combination with a tilting-shoe carrying the finger-beam, hinged at its rear end to the rear arm of the coupling-fork and attached at its front end to the forward arm of the coupling-fork by a slot-and-pin connection, a tilting-lever mounted on the hinged coupling, a link or rod connecting the lever to the front end of the shoe, and a locking device whereby the front end of the shoe may be raised and lowered positively and locked permanently in its adjusted position, substantially as described.

6. In a mowing-machine, a bracket provided with a depending fork, a shoe arranged between the lower ends of said fork, and connected to the rear arm thereof by a hinge and to the forward arm by a slot-and-pin device, and diverging bars A B, joined and rigidly connected to the bracket, and hinged at their diverging ends to the frame of the machine, substantially as described.

7. The combination of the stay-brace C, curved downwardly as well as outwardly, and having flange $c'$, the shoe D, pivoted at the rear to the forward side of said stay-brace, and the regulating-lever G, pivoted to said flange $c'$, all constructed and arranged substantially as and for the purpose specified.

DAVID WOLF.

Witnesses:
J. W. MILLINGTON,
JOSIAH F. MICK.